United States Patent
Yu et al.

(10) Patent No.: US 11,292,171 B2
(45) Date of Patent: *Apr. 5, 2022

(54) THREAD DRAWING PROCESSES

(71) Applicant: WINN APPLIED MATERIAL INC., Changhua County (TW)

(72) Inventors: Chung-Ming Yu, Changhua County (TW); Shi-Wei Wang, Changhua County (TW); Shih-Hao Wang, Changhua County (TW)

(73) Assignee: WINN APPLIED MATERIAL INC., Changhua County (TW)

( * ) Notice: Subject to any disclaimer, the term of this patent is extended or adjusted under 35 U.S.C. 154(b) by 265 days.

This patent is subject to a terminal disclaimer.

(21) Appl. No.: 16/559,836

(22) Filed: Sep. 4, 2019

(65) Prior Publication Data

US 2021/0060843 A1    Mar. 4, 2021

(51) Int. Cl.
| | |
|---|---|
| *B29C 48/05* | (2019.01) |
| *D01D 1/04* | (2006.01) |
| *D01D 10/02* | (2006.01) |
| *D01D 10/06* | (2006.01) |
| *D01D 10/04* | (2006.01) |

(52) U.S. Cl.
CPC ............... *B29C 48/05* (2019.02); *D01D 1/04* (2013.01); *D01D 10/02* (2013.01); *D01D 10/0436* (2013.01); *D01D 10/06* (2013.01)

(58) Field of Classification Search
None
See application file for complete search history.

(56) References Cited

U.S. PATENT DOCUMENTS

| | | | | |
|---|---|---|---|---|
| 3,259,681 A | * | 7/1966 | Bull ........................ | D02J 1/223 264/177.13 |
| 3,279,225 A | * | 10/1966 | Knudsen ............ | D01D 10/0436 68/181 R |
| 3,285,592 A | * | 11/1966 | Ueda ........................ | C08J 3/00 432/13 |
| 3,513,110 A | * | 5/1970 | Noether ................ | D01D 5/247 521/182 |
| 3,691,748 A | * | 9/1972 | Buzano .................... | D01D 5/20 428/369 |
| 3,725,523 A | * | 4/1973 | Bowen .................... | D06B 3/04 264/289.6 |
| 3,789,026 A | * | 1/1974 | Baumann et al. . | D01D 10/0436 521/48 |
| 4,001,367 A | * | 1/1977 | Guthrie ................... | D01D 5/16 264/154 |
| 4,116,924 A | * | 9/1978 | Peabody ................... | C08J 3/22 106/400 |
| 4,265,849 A | * | 5/1981 | Borenstein ............... | D01D 5/16 156/435 |
| 4,389,364 A | * | 6/1983 | Endo .................... | D04H 1/4391 264/167 |

(Continued)

*Primary Examiner* — Xiao S Zhao
*Assistant Examiner* — Emmanuel S Luk
(74) *Attorney, Agent, or Firm* — Guice Patents PLLC (57) ABSTRACT

The thread drawing processes include the steps of feeding, mixing and stirring, first drying, hot melt extrusion, first cooling, stretch extension, second cooling, winding-strands-into-roll, and second drying. The threads made by the processes mainly use thermoplastic polyurethane particles which are easily prepared. When fabric made by the threads is attached to objects, the fabric is flat and neat.

9 Claims, 8 Drawing Sheets

(56) References Cited

U.S. PATENT DOCUMENTS

| | | | | |
|---|---|---|---|---|
| 4,476,302 A * | 10/1984 | Wiezer | ............... | C08G 18/3842 |
| | | | | 544/198 |
| 4,833,026 A * | 5/1989 | Kausch | .................. | C08J 7/0427 |
| | | | | 428/315.5 |
| 4,902,462 A * | 2/1990 | Bert | ......................... | D01D 5/08 |
| | | | | 264/103 |
| 5,234,720 A * | 8/1993 | Neal | ...................... | D01D 5/253 |
| | | | | 427/393.1 |
| 5,609,888 A * | 3/1997 | Uda | ......................... | D01D 5/16 |
| | | | | 425/66 |
| 8,881,497 B2 * | 11/2014 | Zenzen | ..................... | D02J 1/22 |
| | | | | 57/310 |
| 2004/0086702 A1* | 5/2004 | Morin | ....................... | D01F 6/06 |
| | | | | 428/317.9 |
| 2010/0215895 A1* | 8/2010 | Nadkarni | ................... | D01D 5/30 |
| | | | | 428/90 |
| 2011/0203483 A1* | 8/2011 | Yamada | .................... | C08B 3/16 |
| | | | | 106/162.72 |
| 2013/0187367 A1* | 7/2013 | Kim | ...................... | D06N 3/0068 |
| | | | | 280/743.1 |
| 2013/0236583 A1* | 9/2013 | Weinhold | .............. | B29C 48/919 |
| | | | | 425/143 |
| 2015/0298359 A1* | 10/2015 | Pitman | ................... | B29B 9/065 |
| | | | | 524/584 |
| 2016/0096320 A1* | 4/2016 | Bourgoyne | ......... | B29C 48/0019 |
| | | | | 428/304.4 |
| 2018/0347074 A1* | 12/2018 | Humfeld | ................... | D01F 9/32 |
| 2019/0048491 A1* | 2/2019 | Bai | ......................... | C08K 3/04 |

\* cited by examiner

THREAD DRAWING PROCESSES

BACKGROUND OF THE INVENTION

1. Fields of the Invention

The present invention relates to thread drawing processes, and more particularly, to a fabric that is composed of the threads made by the drawing processes, and the fabric is attached another fabric without using adherent.

2. Descriptions of Related Art

The textile industry uses machine to product fabric in a mass scale. However, when using the fabric to an object, such as the fabric is used as the outer surface of a suitcase, the fabric still needs to be glued to the suitcase manually. The fabric is glued to the suitcase and waits for a period of time to dry. It is experienced that the glue is not evenly attached with the fabric, so that after the fabric is secured by the glue, small areas of bumps are found and affect the competitiveness in the market. Besides, the step of applying glue to the suitcase increases manufacturing cost and time. The situation becomes even worse if the surface of the object include multiple pieces of fabric, and the multiple pieces of fabric are glued or sewed together. The outer appearance is not easily handled to meet aesthetic purposes.

The present invention intends to provide thread drawing processes and the fabric composed of the threads made by the processes of the present invention can be easily secured to objects while keep the surface of the objects flat and neat.

SUMMARY OF THE INVENTION

The present invention relates to thread drawing processes which comprises the following steps:

a step of feeding: preparing and inputting a plurality of thermoplastic polyurethane particles into a stirring drum and adding a coupler into the stirring drum;

a step of mixing and stirring: using the stirring drum to mix and stir the thermoplastic polyurethane particles and the coupler;

a step of first drying: drying the thermoplastic polyurethane particles to remove excess water by a dryer, melting the thermoplastic polyurethane particles, wherein the drying temperature of the dryer is from 100° C. to 150° C.;

a step of hot melt extrusion: sending the melted thermoplastic polyurethane particles into a thread molding machine to form a preliminary thread;

a step of first cooling: passing the preliminary thread through a cooling tank so as to shape the surface of the preliminary thread;

a step of stretch extension: passing the cooled preliminary thread through a stretching area to perform a stretch extension, wherein the stretching area includes a plurality of rollers, the rollers are disposed with an interval apart from each other and arranged in rows, and the preliminary thread is driven by each roller, so that the preliminary thread is stretched;

a step of second cooling: entering the preliminary thread processed by the step of stretch extension into an cooling area which is located next to the stretching area, and the preliminary thread being cooled to reduce surface deformation and to fix the interior of the preliminary thread so as to obtain a semi-finished thread;

a step of winding-strands-into-roll: scrolling the semi-finished thread, and a step of second drying: using a dehumidifying and drying device to further reduce humidity in the semi-finished thread so as to obtain a finished thread.

The primary object of the present invention is to provide thread drawing processes and the threads made by the processes are made by thermoplastic polyurethane particles which provide a certain level of stickiness on the surface of the threads so that the fabric made by the threads are easily attached to objects by baking or blow baking. Therefore, the fabric made of the threads does not need extra glue or adherent to attach onto objects.

Another object of the present invention is that the fabric made of the threads of the present invention is flat and neat when being attached to objects.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
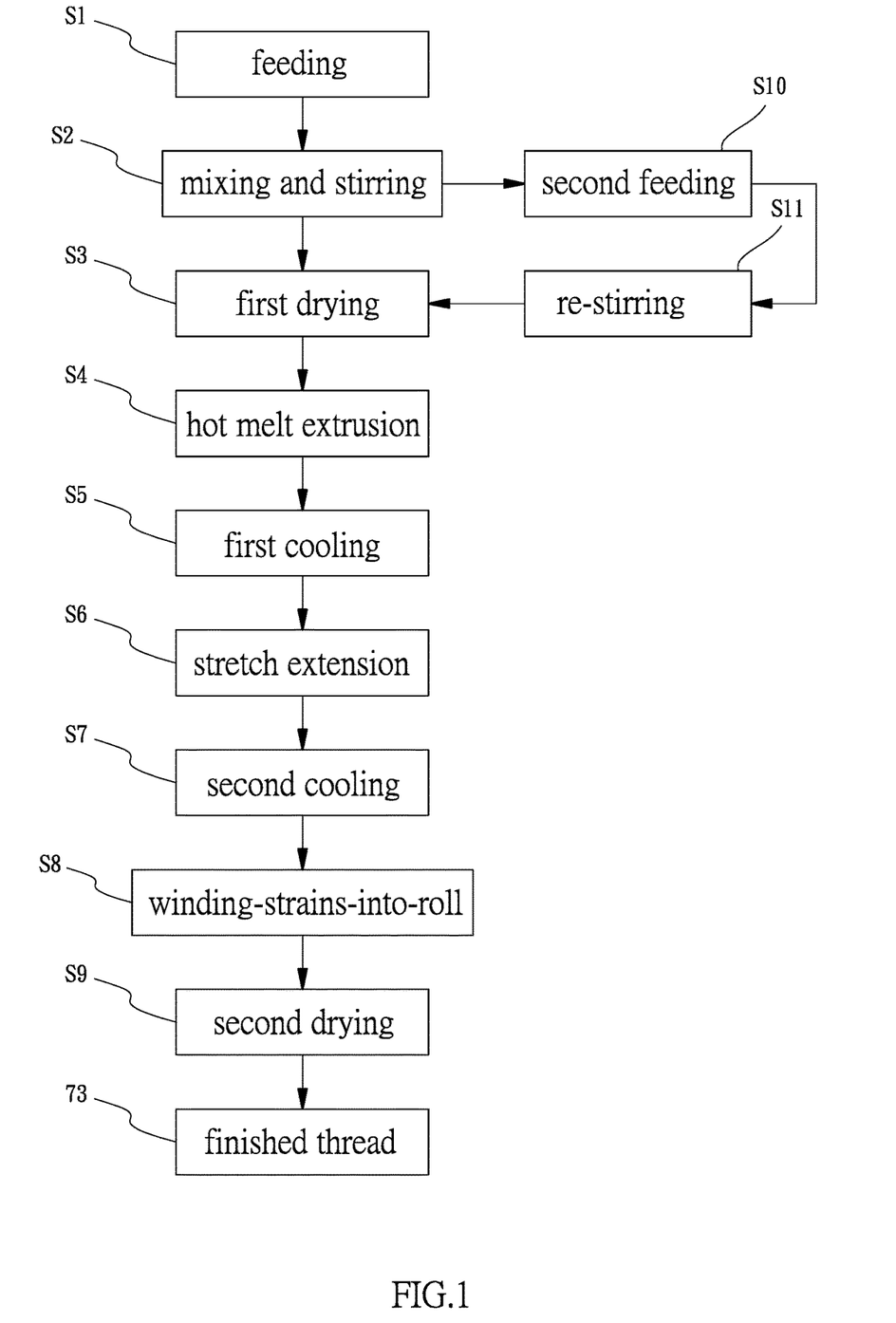
FIG. 1 shows the steps of the processes of the present invention.
Figure 2:
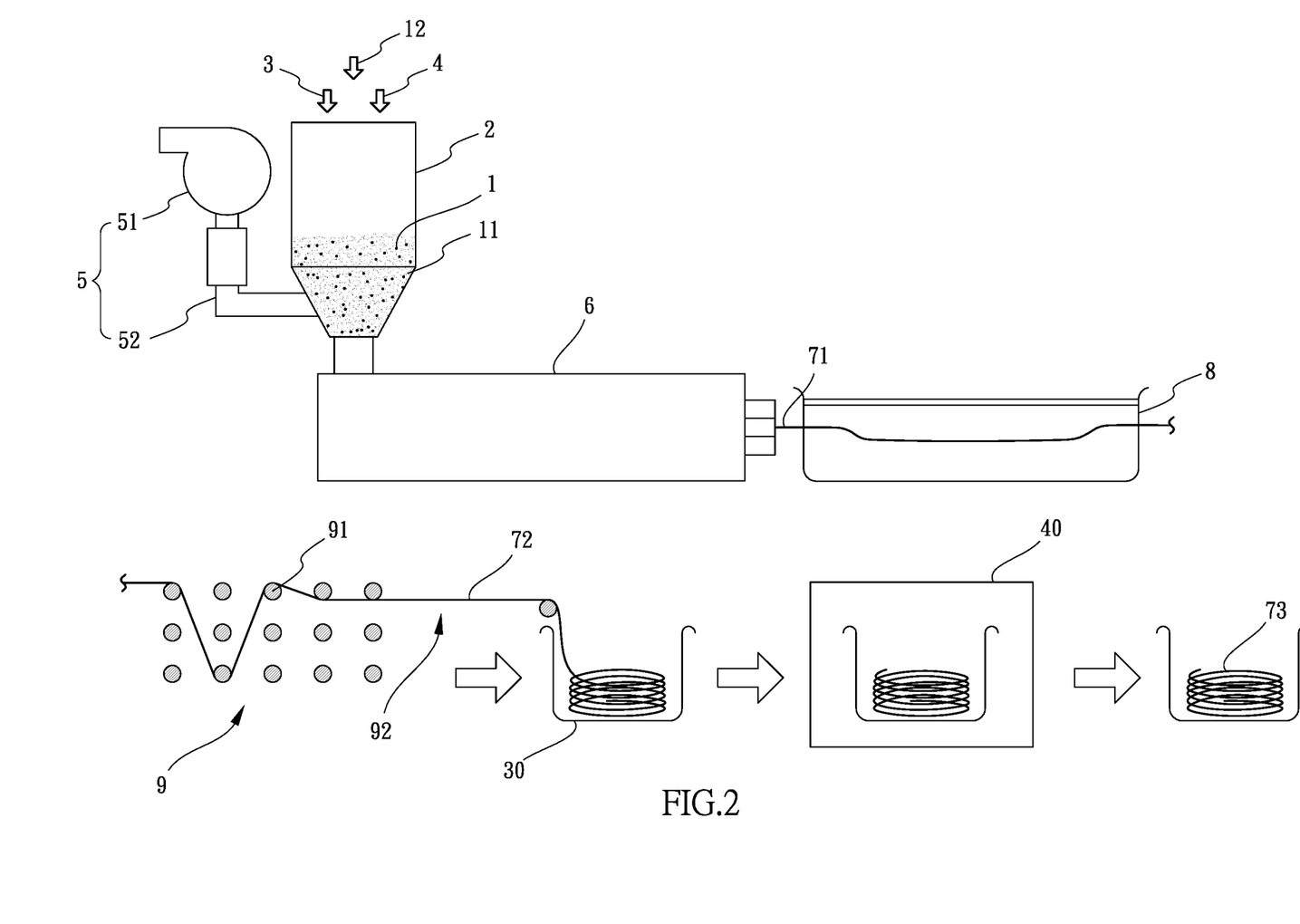
FIG. 2 illustrates the operation of the processes of the present invention.

Referring to FIGS. 1 to 5, the thread drawing processes of the present invention comprises the following steps:

A step S1 of feeding: preparing and inputting a plurality of thermoplastic polyurethane particles 1 into a stirring drum 2 and adding a coupler 11 into the stirring drum 2.

A step S2 of mixing and stirring: using the stirring drum 2 to mix and stir the thermoplastic polyurethane particles 1 and the coupler 11 for 3 to 5 minutes to attach the coupler 11 to the thermoplastic polyurethane particles 1, wherein the thermoplastic polyurethane particles 1 is polyester type or polyether type, or a combination of the polyester type and the polyether type, and the melting point of the plurality of thermoplastic polyurethane particles 1 is from 190° C. to 220° C., the coupler is a mixture of resin and thickener.

If necessary, a brightener 3 is added in the step S2 of mixing and stirring, and the weight proportion of the brightener 3 is 0.2%~0.4% of total weight of the thermoplastic polyurethane particles 1 so that the fabric 10 composed of the threads looks clean. Alternatively, a pigment 4 with a proportion is added in the step S2 of mixing and stirring to provide desired color to the thermoplastic polyurethane particles 1 such that the fabric 10 composed of the threads have colors.

A step S3 of first drying: drying the thermoplastic polyurethane particles 1 to remove excess water by a dryer 5 so that the thermoplastic polyurethane particles 1 do not stick with each other due to the coupler 11 at the initial stage of mixing and stirring. The drying temperature of the dryer 5 is from 100° C. to 150° C. and the drying time is set to be 15 to 60 minutes so as to ensure that the thermoplastic polyurethane particles 1 are melted and become semi-liquid status. The dryer 5 comprises a blower 51 and a heat pipe 52. Two ends of the heat pipe 52 respectively communicate with the blower 51 and the stirring drum 2, and the blower 51 blows hot air from the heat pipe 52 into the stirring drum 2 to dry and melt the thermoplastic polyurethane particles 1.

A step S4 of hot melt extrusion: sending the melted thermoplastic polyurethane particles 1 into a thread molding machine 6 to form a preliminary thread 71.

A step S5 of first cooling: passing the preliminary thread 71 through a cooling tank 8 in which water or cooling liquid is filled so as to shape the surface of the preliminary thread 71.

Figure 3:
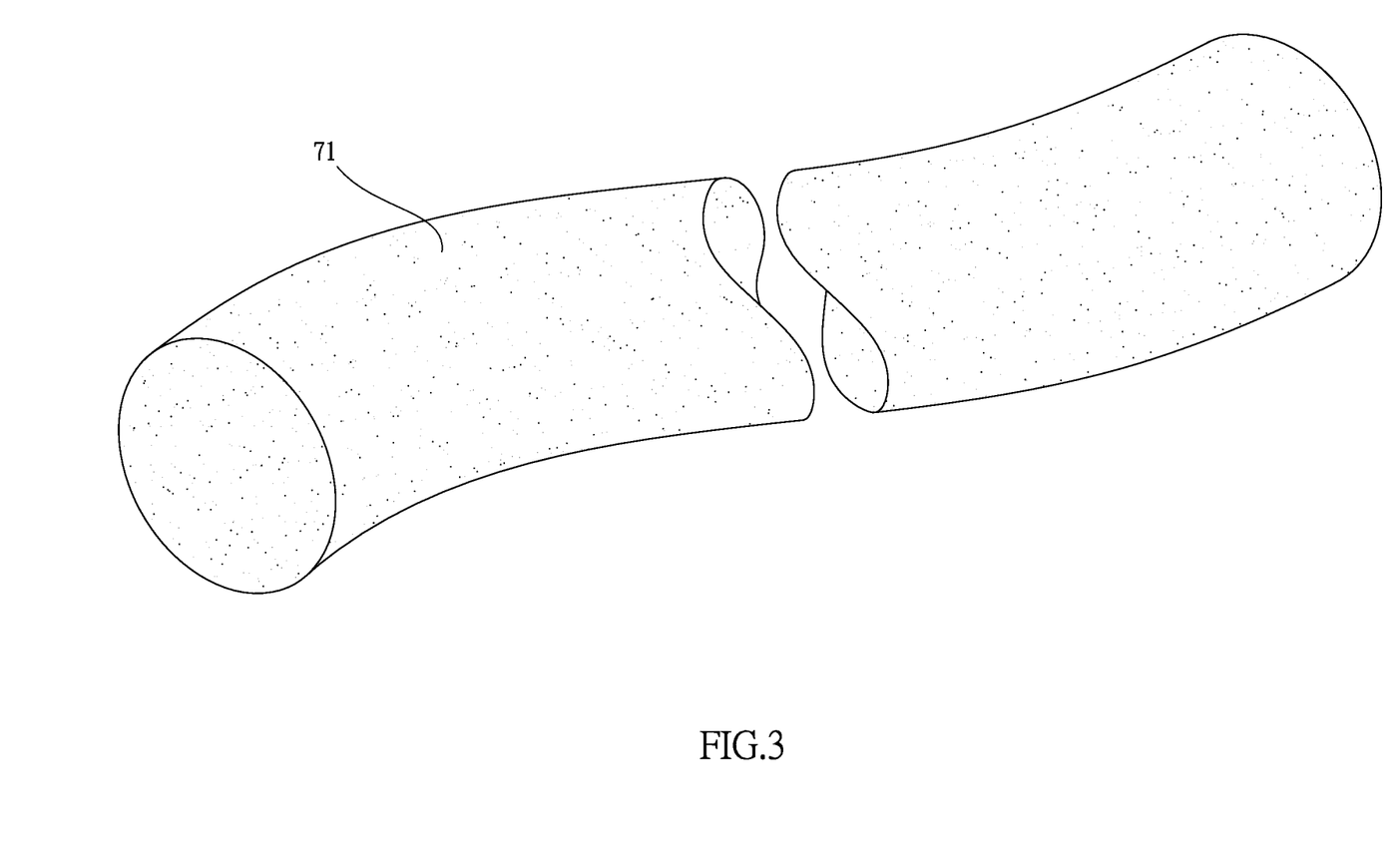
FIG. 3 shows the preliminary thread made by the processes of the present invention.

A step S6 of stretch extension: passing the cooled preliminary thread 71 through a stretching area 9 to perform a stretch extension, wherein the stretching area 9 includes a plurality of rollers 91, the rollers 91 are disposed with an interval apart from each other and arranged in rows, and the preliminary thread 71 is driven by each roller 91, so that the preliminary thread 71 is stretched. The shape of the cross section of the preliminary thread 71 can be controlled by the rotation speed of the rollers 91 and the tension applied to the preliminary thread 71.

A step S7 of second cooling: entering the preliminary thread 71 processed by the step of stretch extension S6 into an cooling area 92 which is located next to the stretching area 9, the preliminary thread 71 being cooled to reduce surface deformation and to fix the interior of the preliminary thread 71 so as to obtain a semi-finished thread 72.

Figure 4:
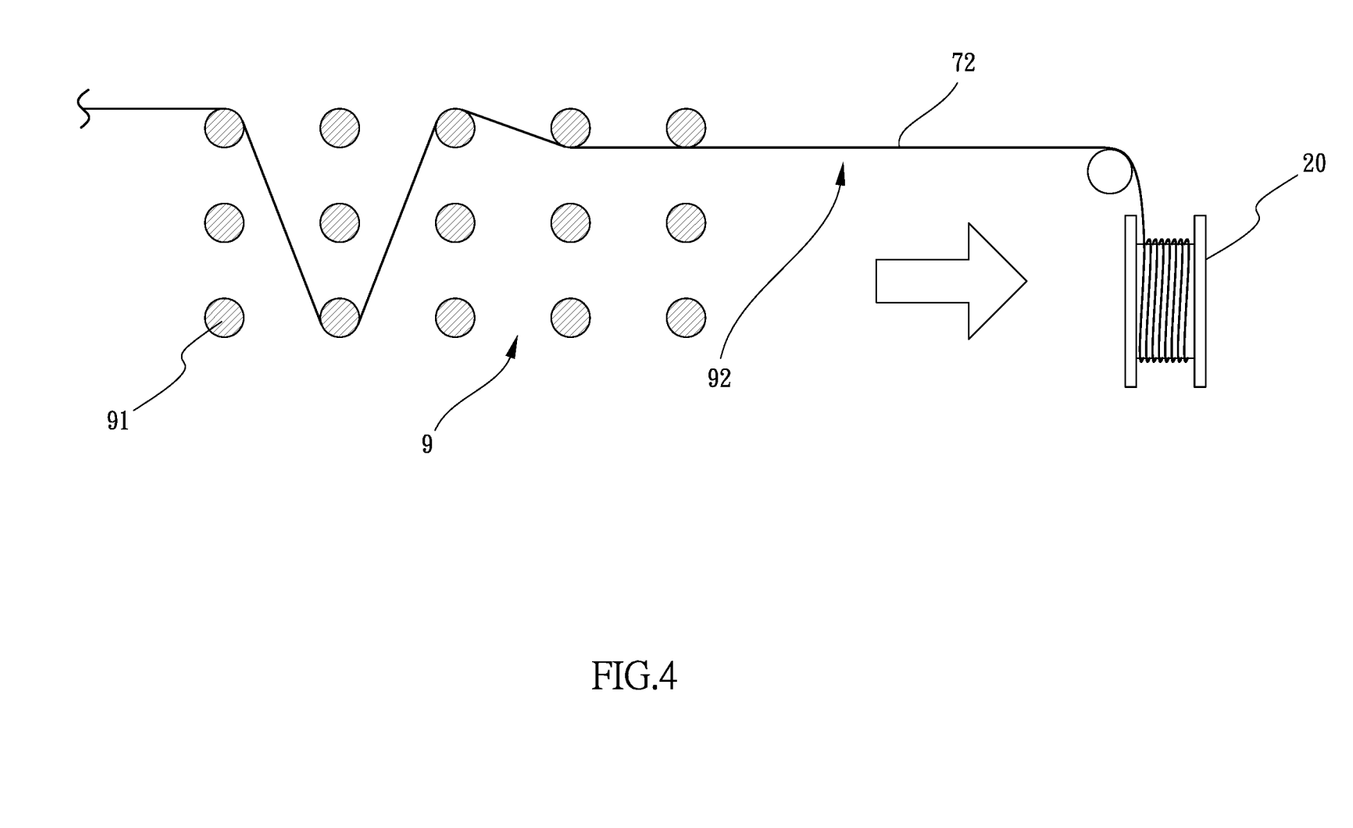
FIG. 4 shows that the semi-finished thread made by the processes of the present invention is scrolled.
Figure 5:
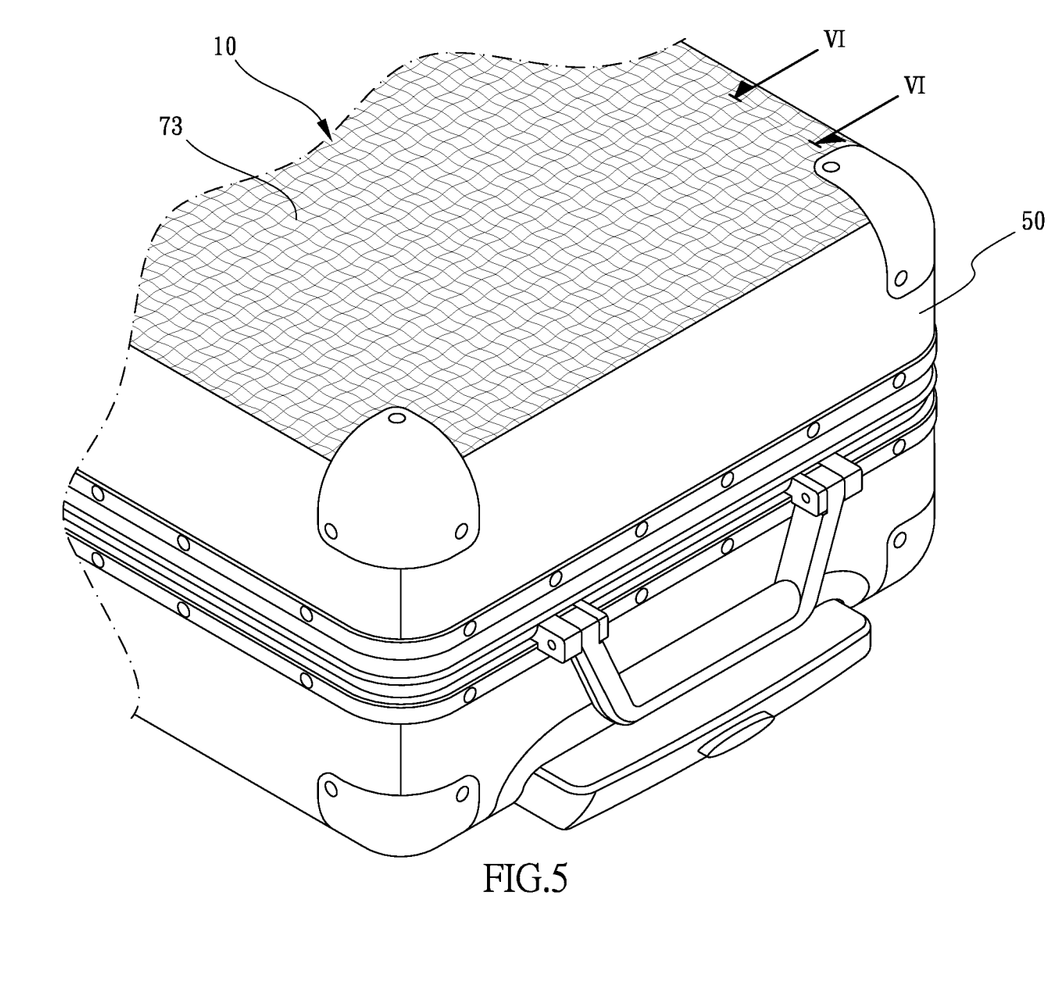
FIG. 5 shows that the fabric composed of threads made by the processes of the present invention is attached to a suitcase.

A step S8 of winding-strands-into-roll: scrolling the semi-finished thread 72. A rotary disc 20 is provided for winding the semi-finished thread 72 in the step S8 of winding-strands-into-roll, or a container 30 is placed in the cooling area 92, and then the container 30 is rotated to collect and store the semi-finished thread 72 in the step S8 of winding-strands-into-roll.

A step S9 of second drying: using a dehumidifying and drying device 40 to further reduce humidity in the semi-finished thread 72 so as to obtain a finished thread 73. The drying time is 48 hours.

As shown in FIG. 1, the present invention further comprises a step S10 of second feeding and a step S11 of re-stirring between the step S2 of mixing and stirring and the step S3 of first drying. The step S10 of second feeding prepares and inputs multiple powders 12 into the stirring drum 2 for stirring, and the multiple powders 12 include fluorescent powder, reflective powder, or fine glass powder. The stirring time of the step S11 of re-stirring is from 3 to 5 minutes.

Figure 6:
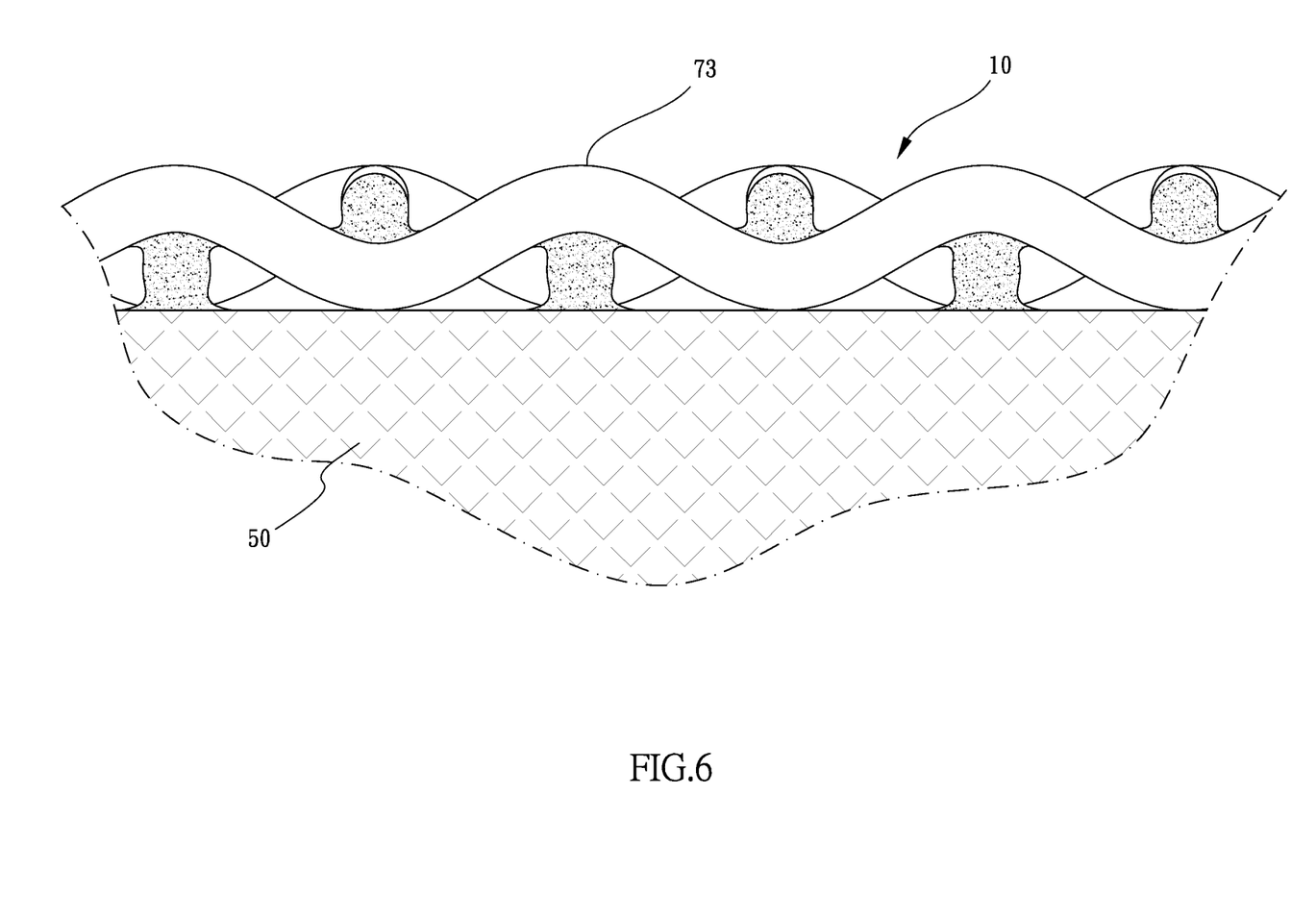
FIG. 6 is a cross sectional view, taken along line VI-VI in FIG. 5.
Figure 7:
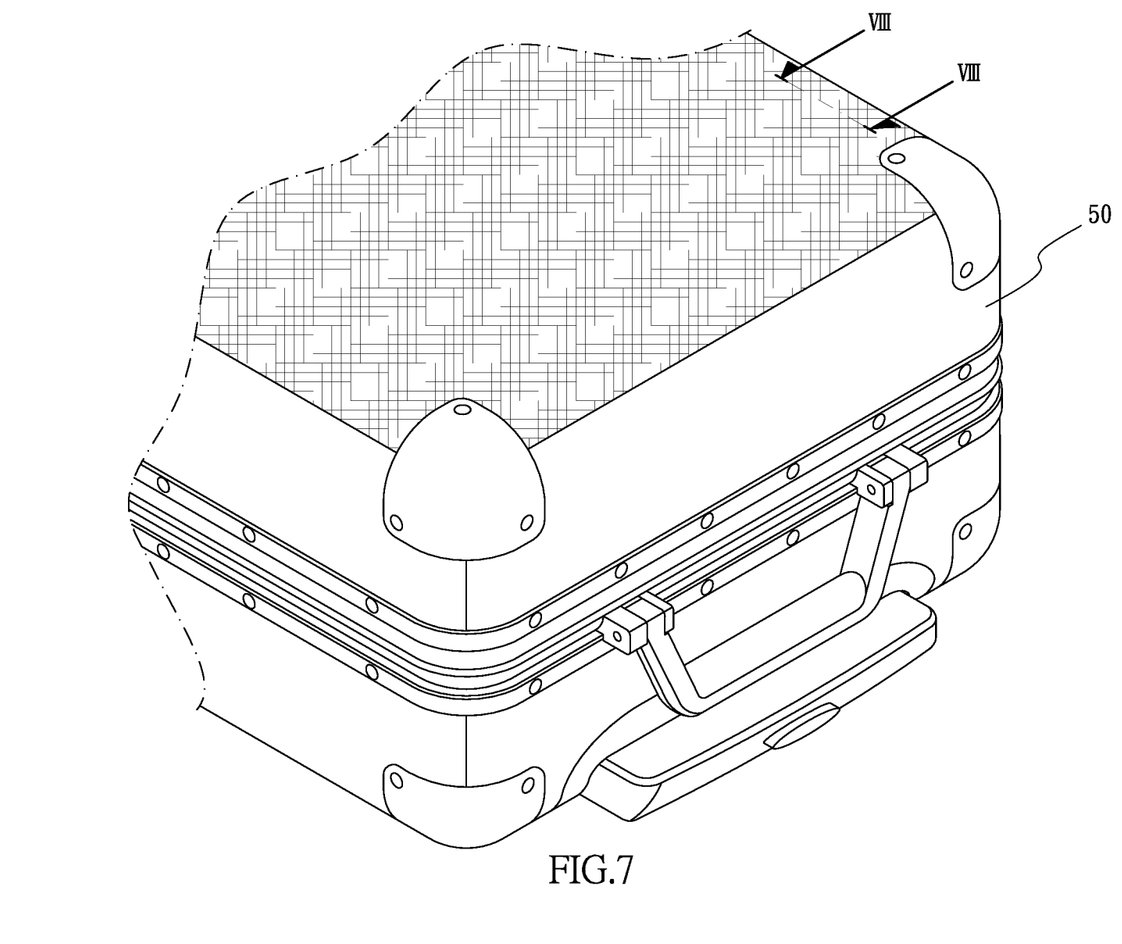
FIG. 7 shows that another fabric composed of threads made by the processes of the present invention is further attached to the suitcase of FIG. 5.
Figure 8:
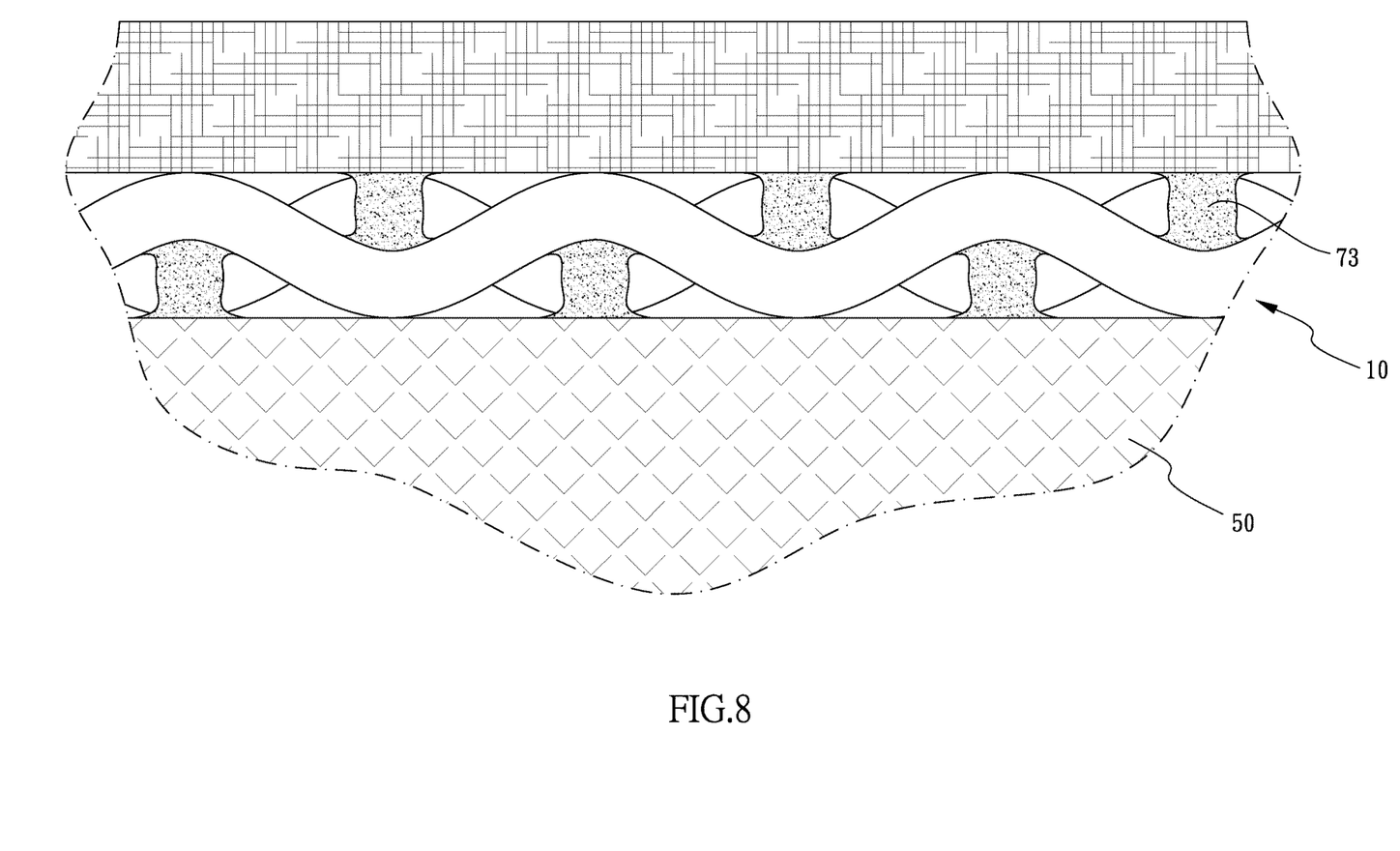
FIG. 8 is a cross sectional view, taken along line VIII-VIII in FIG. 7.

The finished threads 73 are woven to be a fabric 10. It is noted that the fabric 10 can be attached to each other without sewing or gluing, and the fabric 10 can be easily attached to objects such as the suitcase 50 disclosed in FIG. 5. Alternatively, the fabric 10 composed of the finished threads 73 is overlapped onto another piece of fabric, and the fabric 10 can be heated by any known methods to melt the thermoplastic polyurethane particles 1. The thermoplastic polyurethane particles 1 are mixed with the coupler 11 to have a certain level of stickiness so that the fabric 10 can be easily attached to another piece of fabric without using glue or adherent as shown in FIGS. 6 to 8.

The fabric 10 composed of the finished threads 73 of the present invention can be attached to objects of different types of material which can be another piece of fabric, a hard case, or a plastic object. The fabric 10 composed of the finished threads 73 of the present invention can also be sandwiched between two pieces of fabric.

While we have shown and described the embodiment in accordance with the present invention, it should be clear to those skilled in the art that further embodiments may be made without departing from the scope of the present invention.

What is claimed is:

1. Thread drawing processes comprising the steps of:
   a step of feeding: preparing and inputting a plurality of thermoplastic polyurethane particles into a stirring drum and adding a coupler into the stirring drum;
   a step of mixing and stirring: using the stirring drum to mix and stir the thermoplastic polyurethane particles and the coupler, the thermoplastic polyurethane particles being not adhered with each other, the coupler attached to the thermoplastic polyurethane particles;
   a step of first drying: drying the thermoplastic polyurethane particles to remove excess water by a dryer, melting the thermoplastic polyurethane particles, wherein a drying temperature of the dryer is from 100° C. to 150° C. ° C. to make the thermoplastic polyurethane particles in a semi liquid status;
   a step of hot melt extrusion: sending the melted thermoplastic polyurethane particles into a thread molding machine to form a preliminary thread;
   a step of first cooling: passing the preliminary thread through a cooling tank so as to shape a surface of the preliminary thread;
   a step of stretch extension: passing the cooled preliminary thread through a stretching area to perform a stretch extension, wherein the stretching area includes a plurality of rollers, the rollers are disposed with an interval apart from each other and arranged in rows, and the preliminary thread is driven by each roller, so that the preliminary thread is stretched;
   a step of second cooling: entering the preliminary thread processed by the step of stretch extension into a cooling area which is located next to the stretching area, the preliminary thread being cooled to reduce a surface deformation and to fix an interior of the preliminary thread so as to obtain a semi-finished thread;
   a step of winding-strands-into-roll: scrolling the semi-finished thread, and
   a step of second drying: using a dehumidifying and drying device to further reduce humidity in the semi-finished thread so as to obtain a finished thread.

2. The thread drawing processes as claimed in claim 1, wherein the thermoplastic polyurethane particles is polyester or polyether, or a combination of the polyester and the polyether, a melting point of the plurality of thermoplastic polyurethane particles is from 190° C. to 220° C., the coupler is a mixture of resin and thickener.

3. The thread drawing processes as claimed in claim 2, wherein a brightener is added in the step of mixing and stirring, and a weight proportion of the brightener is 0.2%~0.4% of total weight of the thermoplastic polyurethane particles.

4. The thread drawing processes as claimed in claim 3, wherein a pigment with a weight proportion is added in the step of mixing and stirring.

5. The thread drawing processes as claimed in claim 4, wherein a stirring time of the step of mixing and stirring is from 3 to 5 minutes.

6. The thread drawing processes as claimed in claim 5, wherein the dryer comprises a blower and a heat pipe, two ends of the heat pipe respectively communicate with the blower and the stirring drum, and the blower blows hot air from the heat pipe into the stirring drum to dry the thermoplastic polyurethane particles.

7. The thread drawing processes as claimed in claim 6, wherein a rotary disc is provided for winding the semi-finished thread in the step of winding-strands-into-roll, or a container is placed in the cooling area, and then the container is rotated to collect and store the semi-finished thread in the step of winding-strands-into-roll.

8. The thread drawing processes as claimed in claim 6, wherein the drying time of the step of first drying is from 15 to 60 minutes.

9. The thread drawing processes as claimed in claim 8, further comprising a step of second feeding and a step of re-stirring between the step of mixing and stirring and the step of first drying, wherein the step of second feeding prepares and inputs multiple powders into the stirring drum for stirring, and the multiple powders include fluorescent powder, reflective powder, or fine glass powder, and a stirring time of the step of re-stirring is from 3 to 5 minutes.

\* \* \* \* \*